US012592066B2

(12) United States Patent
Chien et al.

(10) Patent No.: US 12,592,066 B2
(45) Date of Patent: Mar. 31, 2026

(54) OBSTACLE IDENTIFICATION METHOD, VEHICLE-MOUNTED DEVICE AND STORAGE MEDIUM

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 397 days.

(21) Appl. No.: 18/119,625

(22) Filed: Mar. 9, 2023

(65) Prior Publication Data

US 2024/0203107 A1    Jun. 20, 2024

(30) Foreign Application Priority Data

Dec. 16, 2022    (CN) .......................... 202211626938.5

(51) Int. Cl.
| | |
|---|---|
| *G06V 10/80* | (2022.01) |
| *G01S 7/41* | (2006.01) |
| *G01S 13/86* | (2006.01) |
| *G01S 13/931* | (2020.01) |
| *G06T 7/10* | (2017.01) |
| *G06T 7/70* | (2017.01) |
| *G06V 10/82* | (2022.01) |
| *G06V 20/58* | (2022.01) |

(52) U.S. Cl.
CPC ............ *G06V 10/803* (2022.01); *G01S 7/412* (2013.01); *G01S 13/867* (2013.01); *G01S 13/931* (2013.01); *G06T 7/10* (2017.01); *G06T 7/70* (2017.01); *G06V 10/82* (2022.01); *G06V*

*20/58* (2022.01); *G06T 2207/10028* (2013.01); *G06T 2207/20021* (2013.01); *G06T 2207/30261* (2013.01)

(58) Field of Classification Search
CPC ...... G06V 10/803; G06V 10/82; G06V 20/58; G06V 10/762; G01S 7/412; G01S 13/867; G01S 13/931; G01S 7/41; G06T 7/10; G06T 7/70; G06T 2207/10028; G06T 2207/20021; G06T 2207/30261
See application file for complete search history.

(56) References Cited

U.S. PATENT DOCUMENTS

| | | | |
|---|---|---|---|
| 2014/0035775 A1 | 2/2014 | Zeng et al. | |
| 2019/0120934 A1* | 4/2019 | Slutsky ................. | G01S 13/931 |
| 2020/0355820 A1* | 11/2020 | Zeng ...................... | G01S 13/865 |

(Continued)

FOREIGN PATENT DOCUMENTS

| | | |
|---|---|---|
| CN | 111289998 | 6/2020 |

*Primary Examiner* — Vladimir Magloire
*Assistant Examiner* — Naomi M Wolford
(74) *Attorney, Agent, or Firm* — ScienBiziP, P.C.

(57) ABSTRACT

An obstacle identification method applied to a vehicle-mounted device is provided. The method includes collecting radar information and original image information. Fused image information is obtained by fusing the radar information with the original image information. Obstacle point cloud and non-obstacle point cloud are obtained from the fused image information, and the non-obstacle point cloud is filtered out from the fused image information. Once at least one radar point cloud group is obtained by grouping the obstacle point cloud, an obstacle corresponding to each group of the at least one radar point cloud group can be identified.

8 Claims, 3 Drawing Sheets

(56) References Cited

U.S. PATENT DOCUMENTS

2021/0331695 A1* 10/2021 Ramakrishnan ............................
                                     B60W 60/00276
2022/0343637 A1* 10/2022 Zhou ................... G08G 1/0112

* cited by examiner

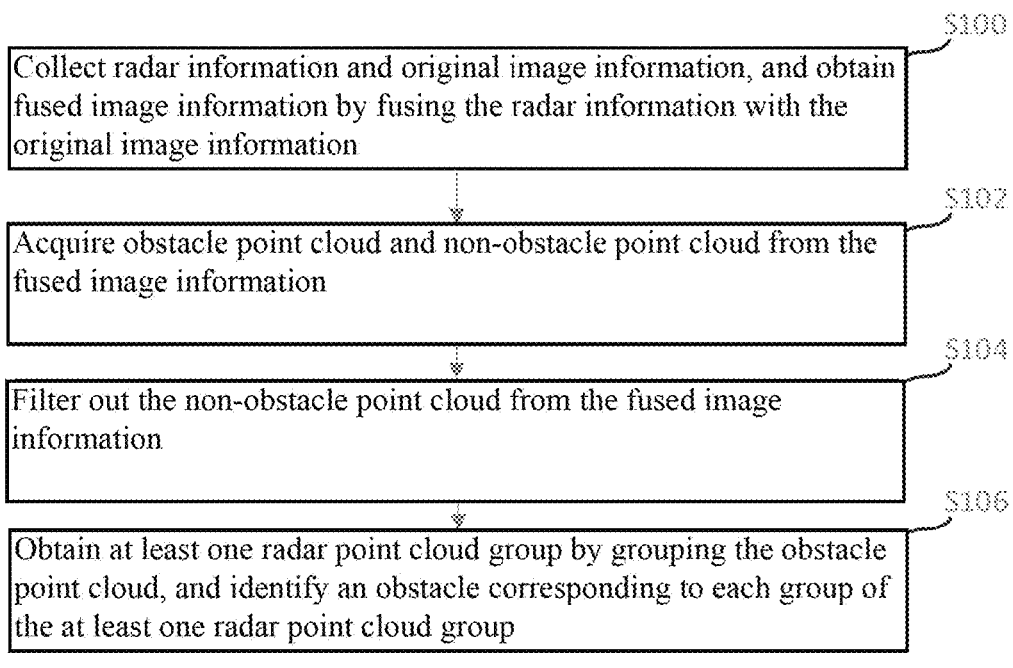

Collect radar information and original image information, and obtain fused image information by fusing the radar information with the original image information
S100

Acquire obstacle point cloud and non-obstacle point cloud from the fused image information
S102

Filter out the non-obstacle point cloud from the fused image information
S104

Obtain at least one radar point cloud group by grouping the obstacle point cloud, and identify an obstacle corresponding to each group of the at least one radar point cloud group
S106

FIG. 1

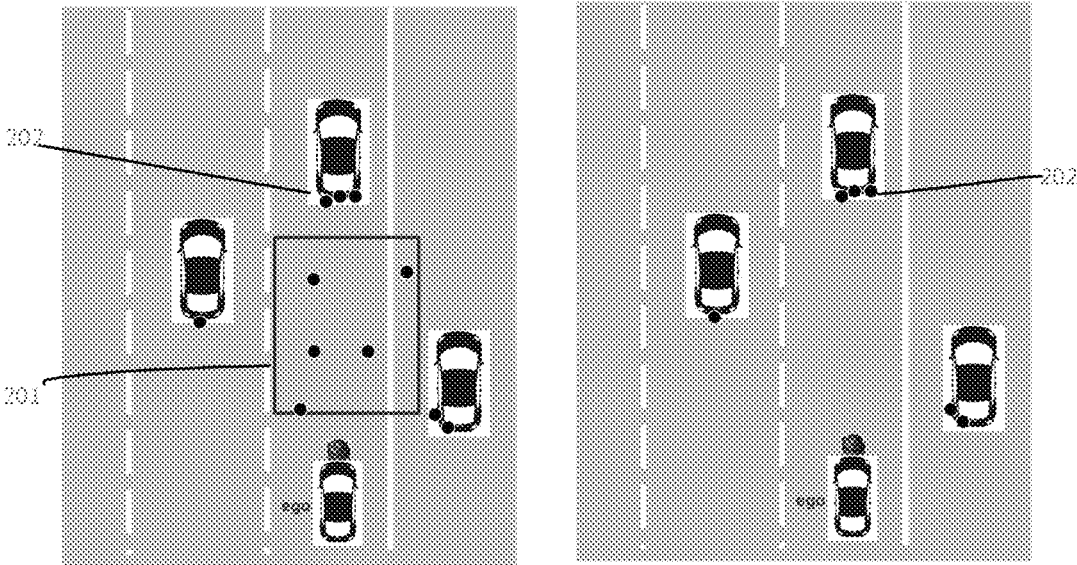

FIG. 2

OBSTACLE IDENTIFICATION METHOD, VEHICLE-MOUNTED DEVICE AND STORAGE MEDIUM

FIELD

The present disclosure relates to the field of intelligent driving technology, in particular to an obstacle identification method, a vehicle-mounted device, and a storage medium.

BACKGROUND

At present, in the field of intelligent driving technology, in a process of identifying an obstacle, radar point cloud is usually obtained by using a radar, the obstacle is identified according to the radar point cloud. However, in practical applications, when a vehicle uses an Advanced Driving Assistance System (ADAS) assists driving, as the obstacle includes a plurality of radar points, if the radar point cloud is grouped directly according to corresponding distances detected by the radar, the obstacle may not be accurately identified. Therefore, improperly control may be made to the vehicle, which may affect driving safety and driving experience.

BRIEF DESCRIPTION OF THE DRAWINGS

FIG. 1 is a flow chart of an obstacle identification method provided by an embodiment of the present disclosure.

FIG. 2 is a schematic diagram of filtering non-obstacle point cloud provided by the embodiment of the present disclosure.

DETAILED DESCRIPTION

Figure 3:
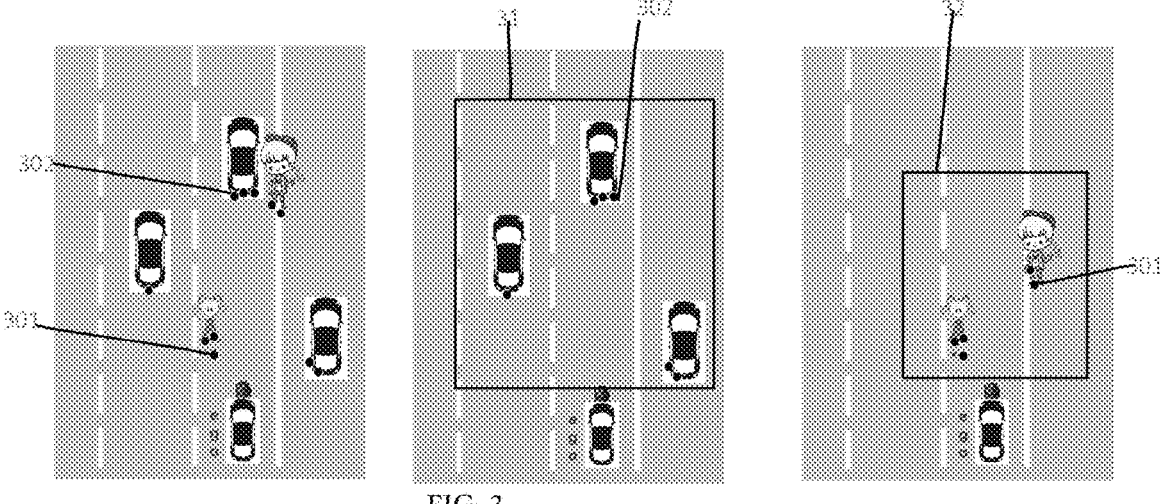
FIG. 3 is a schematic diagram of dividing obstacle point cloud into multiple sets provided by the embodiment of the present disclosure.

In order to more clearly understand the above objects, features and advantages of the present disclosure, the present disclosure will be described in detail below in conjunction with the accompanying drawings and specific embodiments. It should be noted that, in the case of no conflict, the embodiments of the present disclosure and the features in the embodiments can be combined with each other.

Many specific details are set forth in the following description to facilitate a full understanding of the present disclosure, and the described embodiments are only some of the embodiments of the present disclosure, rather than all of them. Based on the embodiments in the present disclosure, all other embodiments obtained by persons of ordinary skill in the art without making creative efforts fall within the protection scope of the present disclosure.

Unless otherwise defined, all technical and scientific terms used herein have the same meaning as commonly understood by one of ordinary skill in the art to which this disclosure belongs. The terminology used herein in the description of the present disclosure is only for the purpose of describing specific embodiments, and is not intended to limit the present disclosure.

The terms "first", "second" and "third" in the specification and claims of the present disclosure and the above drawings are used to distinguish different objects, rather than to describe a specific order. Furthermore, the term "comprise", as well as any variations thereof, is intended to cover a non-exclusive inclusion. For example, a process, a method, a system, a product or a device comprising a series of blocks or units is not limited to the listed blocks or units, but optionally also includes unlisted blocks or units, or optionally further includes other blocks or units inherent in the process, the method, the product or the device.

At present, in the field of intelligent driving technology, in a process of identifying an obstacle, radar point cloud is usually obtained by using a radar, the radar point cloud is grouped, and the obstacle is identified according to the grouped radar point cloud. However, in practical applications, as the obstacle includes a plurality of detecting points, if the radar point cloud is grouped directly according to corresponding distances detected by the radar, the obstacle may not be accurately identified when a vehicle uses an Advanced Driving Assistance System (ADAS) assists driving, therefore, improperly control may be made to the vehicle, which may affect driving safety and driving experience.

In order to improve the accuracy of obstacle identification, this disclosure provides an obstacle identification method, a vehicle-mounted device, and a storage medium, which can analyze the radar point cloud, improve the accuracy of obstacle identification, and avoid misjudgment to the obstacle that affect driving safety.

In order to make the purpose, the technical solution and advantages of the obstacle identification provided by the embodiments of the present disclosure clearer, the following describes in detail with reference to the accompanying drawings and specific embodiments.

As shown in FIG. 1, it is a flow chart of the obstacle identification method provided by an embodiment of the present disclosure. The obstacle identification method can be applied to a vehicle-mounted device (such as the vehicle-mounted device 1 shown in FIG. 5). For a vehicle-mounted device that requires the obstacle identification, the obstacle identification provided by the method of the disclosed embodiment can be directly integrated on the vehicle-mounted device. A function of the obstacle identification, or run on the vehicle device in the form of a software development kit (SDK).

In the embodiment of the present disclosure, the vehicle-mounted device may be a device configured in a vehicle, which is installed in the vehicle and has a corresponding software system to execute various instructions. In other embodiments, the vehicle-mounted device may also be an external device communicated with the vehicle, the external device can obtain data of the vehicle and the vehicle can be controlled by the external device.

The vehicle-mounted device may be a vehicle-mounted computer, a mobile phone, a tablet computer, a desktop computer, a laptop computer, a handheld computer, a notebook computer, an ultra-mobile personal computer (UMPC), a netbook, and a cellular phone, a personal Digital assistant (PDA), an artificial intelligence (AI) equipment, a wearable equipment and other electronic device. The embodiment of the present disclosure does not specifically limit a specific form of the vehicle-mounted device. A network where the vehicle-mounted device is located includes, but is not limited to: the Internet, a wide area network, a metropolitan area network, a local area network, a virtual private network (VPN) and the like. The present disclosure does not limit the specific form of the network where the vehicle-mounted device is located.

According to different requirements, an order of the blocks in the flowchart of the obstacle identification method can be changed, and some blocks can be omitted.

Block S100, the vehicle-mounted device collects radar information and original image information, and obtains fused image information by fusing the radar information with the original image information.

Figure 5:
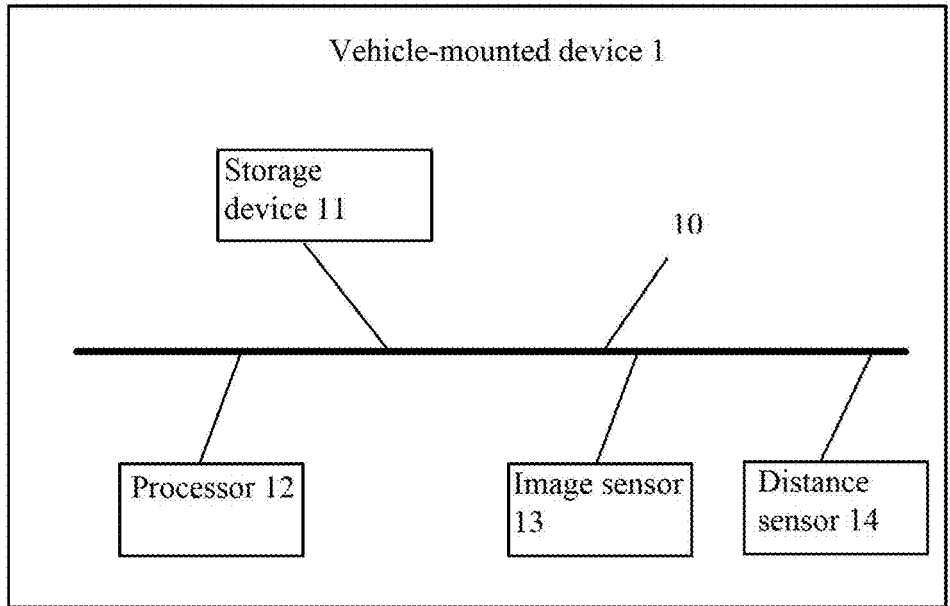
FIG. 5 is a schematic diagram of a vehicle-mounted device provided by an embodiment of the present disclosure.

In one embodiment of the present disclosure, the vehicle-mounted device may include a multi-sensor detection system, and the multi-sensor detection system includes a plurality of sensor devices. The plurality of sensor devices includes a distance sensor 14 as shown in FIG. 5 and an image sensor 13 as shown in FIG. 5. Specifically, the distance sensor 14 may be a radar device (such as a millimeter-wave radar), and the image sensor 13 may be a camera device (such as a monocular camera device). The camera device may be a driving recorder installed on the vehicle, or the camera device may be one or more cameras, and the one or more cameras may be installed on the vehicle. In other embodiments, the camera device may be an external device that is communicatively connected with the vehicle through a network or the like. The camera device is not limited to the above examples in practical applications.

The radar device may be installed in the vehicle, for example, the radar device may be installed at a position where a front windshield of the vehicle is located. The radar device may be used to acquire radar information (for example, three-dimensional point cloud) in a traveling direction of the vehicle. The camera device may be installed at the position where the front windshield of the vehicle is located, and is used to acquire image information (for example, a two-dimensional image) in the traveling direction of the vehicle.

In an embodiment of the present disclosure, the fusing the radar information with the original image information includes: obtaining a corresponding relationship between each point of the radar point cloud and each pixel point of the two-dimensional image by performing a joint calibration on the radar device and the camera device; and projecting the radar point cloud into the two-dimensional image according to the corresponding relationship.

In an embodiment of the present disclosure, the vehicle-mounted device obtains a transformation matrix between a world coordinate system of the radar device and a pixel coordinate system of the camera device based on external parameters of the camera device; and obtaining coordinates of the radar point cloud in the pixel coordinate system by projecting the radar point cloud from the world coordinate system into the pixel coordinate system based on the transformation matrix. Specifically, the vehicle-mounted device may use a plurality of calibration tools to perform the joint calibration. For example, the plurality of calibration tools includes, but are not limited to, a sensor device calibration tool of APOLLO, a Calibration Tookit module of autoware, and the like.

In an embodiment of the present disclosure, the obtaining of the transformation matrix between the world coordinate system of the radar device and the pixel coordinate system of the camera device based on external parameters of the camera device includes: obtaining the external parameters of the radar device and the external parameters (e.g., a rotation matrix, a translation vector) of the camera device; and obtaining the transformation matrix by using a preset algorithm (e.g., a Perspective-n-Point algorithm) based on the external parameters of the radar device and the external parameters of the camera device.

In an embodiment of the present disclosure, the vehicle-mounted device projects each point of the radar point cloud from the world coordinate system into the pixel coordinate system based on the transformation matrix; obtains the internal parameters (e.g., a focal length, a principal point, a tilt coefficient, a distortion coefficient, etc.) of the camera device by performing a camera calibration on the camera device; eliminates a distortion effect of a convex lens of the camera device based on the internal parameters of the camera device; and projects each point projected into the pixel coordinate system into the two-dimensional image.

In an embodiment of the present disclosure, the multi-sensor detection system can effectively improve the vehicle's ability to perceive a surrounding environment and a safety performance of the vehicle. The fusion of the radar information and the original image information enables the vehicle-mounted device to have obvious advantages in acquiring environmental information, identifying obstacles, and the like. Among them, compared with other distance measuring sensors, the millimeter-wave radar has the advantages of wide detection range and less influence by weather, and has good applicability.

Block S102, the vehicle-mounted device acquires obstacle point cloud and non-obstacle point cloud from the fused image information.

In an embodiment of the present disclosure, the acquiring the obstacle point cloud and the non-obstacle point cloud from the fused image information includes: identifying a target object from the original image information by using a preset deep neural network; determining pixel points corresponding to the target object and coordinates of the pixel points; determining whether the pixel points corresponding to the target object are obstacle pixel points or non-obstacle pixel points; when the pixel points corresponding to the target object are obstacle pixel points, determining the radar point cloud corresponding to the obstacle pixel points in the fused image information to be the obstacle point cloud, and when the pixel points corresponding to the target object are non-obstacle pixel points, determining the radar point cloud corresponding to the non-obstacle pixel points in the fused image information to be the non-obstacle point cloud. In one embodiment, when the target object is an obstacle, the pixel points corresponding to the target object are obstacle pixel points.

In an embodiment of the present disclosure, the preset deep neural network may be a neural network based on YOLOv3 (You Only Look Once), and the YOLOv3 utilizes a full convolutional network to divided the fused image information into a plurality of sub-regions; predicting a bounding box of the target object and determining the target object in each sub-region; determining the pixel points corresponding to the target object and the coordinates of the pixel points; obtaining coordinates of the radar point cloud in the two-dimensional image; when the pixel points corresponding to the target object are non-obstacle pixel points, determining the radar point cloud corresponding to the non-obstacle pixel points in the fused image information as to be the non-obstacle point cloud, according to the coordinates of the non-obstacle pixel points; when the pixel points corresponding to the target object are obstacle pixel points, determining the radar point cloud corresponding to the obstacle pixel points in the fused image information as to be the obstacle point cloud, according to the coordinates of the obstacle pixel points. Wherein, abscissas and ordinates of the radar point cloud corresponding to the non-obstacle pixel points are the same as the abscissas and ordinates of the non-obstacle pixel points respectively. The abscissas and ordinates of the radar point cloud corresponding to the obstacle pixel points are the same as the abscissas and ordinates of the obstacle pixel points respectively.

Block S104, the vehicle-mounted device filters out the non-obstacle point cloud from the fused image information.

As shown in FIG. 2, it is a schematic diagram of filtering out the non-obstacle point clouds. The non-obstacle point cloud 201 shown in FIG. 2 is filtered out, and the obstacle point cloud 202 is retained.

Block S106, the vehicle-mounted device obtains at least one radar point cloud group by grouping the obstacle point cloud, and identifies an obstacle corresponding to each group of the at least one radar point cloud group.

In an embodiment of the present disclosure, the obtaining of the at least one radar point cloud group by grouping the obstacle point cloud includes: dividing the obstacle point cloud into a plurality of sets; obtaining the at least one radar point cloud group by clustering the obstacle point cloud corresponding to each set of the plurality of sets.

FIG. 3 is a schematic diagram of the dividing of the obstacle point cloud into the plurality of sets. The dividing of the obstacle point cloud into the plurality of sets includes: grouping obstacles corresponding to a same category into one set. For example, in FIG. 3, vehicle obstacles are classified into one set 31, and person obstacles are classified into another set 32. In FIG. 3, a distance between the point cloud corresponding to the vehicle obstacle 302 and the point cloud corresponding to the person obstacle 301 is relatively short. In order to accurately distinguish the vehicle obstacle 302 and the person obstacle 301, firstly, from the fused image information, it can be determined that pixel points corresponding to an area where the vehicle obstacle 302 is located and pixel points corresponding to an area where the person obstacle 301 is located are corresponding different sets, thereby the vehicle-mounted device can divide the vehicle obstacle 302 and the person obstacle 301 into different sets. The vehicle obstacle can be defined as another vehicle which acts as an obstacle of the vehicle. The person obstacle can be defined as a person which acts as an obstacle of the vehicle.

In an embodiment of the present disclosure, the obtaining of the at least one radar point cloud group by clustering the obstacle point cloud corresponding to each of the plurality of sets includes: identifying the target object from the fused image information by using the preset deep neural network; determining the bounding box of the target object; classifying obstacle point cloud corresponding to the target object based on the bounding box of the target object; clustering the classified obstacle point cloud, and obtaining a radar point cloud group; obtaining a surrounding box of the target object according to the radar point cloud group and the corresponding bounding box of the target object; and determining the obstacle corresponding to the radar point cloud group based on the surrounding box.

In this embodiment, the vehicle-mounted device may use a DBSCAN (Density-Based Spatial Clustering of Applications with Noise) clustering algorithm to cluster the obstacle point cloud. DBSCAN is a density clustering algorithm, and the vehicle-mounted device can determine clustering categories through a tightness of sample distribution. Specifically, the vehicle-mounted device can obtain a cluster category by classifying closely connected samples into the same category. In this manner, the vehicle-mounted device can obtain different clustering categories.

The DBSCAN clustering algorithm can be applied to both convex sample sets and non-convex sample sets. The advantage of the DBSCAN clustering algorithm is that the clustering speed is fast and it can effectively deal with noise points and discover spatial clusters of arbitrary shapes.

In this embodiment, the vehicle-mounted device divides the closely connected radar point clouds in each group into one category to obtain multiple cluster categories, thereby dividing the areas with sufficiently high density into clusters, and can distinguish between noise Arbitrary-shaped clusters are found in spatial databases, enabling efficient identification of different classes of obstacles.

The obstacle recognition method provided by the embodiment of the present disclosure fuses radar information with image information, obtains obstacle point cloud and non-obstacle point cloud based on the fused image information, and filters out the non-obstacle point cloud. The obstacle point cloud is grouped to identify obstacles, which can effectively improve the accuracy of obstacle identification. Based on the identified obstacles, driving safety can be ensured.

Figure 4:
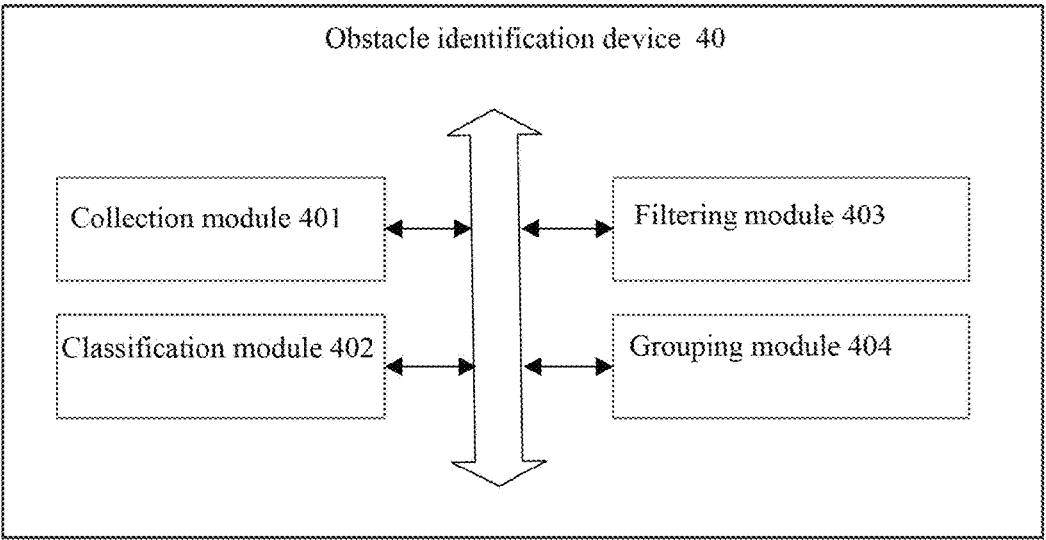
FIG. 4 is a schematic diagram of an obstacle identification device provided by an embodiment of the present disclosure.

As shown in FIG. 4, it is a functional block diagram of a preferred embodiment of the obstacle identification device of the present disclosure. The obstacle identification device 40 includes a collection module 401, a classification module 402, a filtering module 403 and a grouping module 404. In this embodiment, the functions of each module/unit will be described in detail in subsequent embodiments.

The collection module 401 is used to collect the radar information and the original image information, fuse the radar information with the original image information, and obtains the fused image information.

The classification module 402 is used to obtain, from the fused image information, the obstacle point cloud and the non-obstacle point cloud.

The filtering module 403 is used to filter out the non-obstacle point cloud from the fused image information.

The grouping module 404 is used to group the obstacle point cloud to obtain radar point cloud groups, and identify the obstacle corresponding to each radar point cloud group.

In an embodiment of the present disclosure, the collection module 401 is further configured to: jointly calibrate the radar device that obtains the radar information and the camera device that obtains the image information; combine the radar point cloud with the image information.

In an embodiment of the present disclosure, the collection module 401 is further configured to: based on the external parameters of the camera device, obtain the transformation matrix between the world coordinate system of the radar device and the pixel coordinate system of the camera device; projecting the coordinates of the radar point cloud from the world coordinate system into the pixel coordinate system based on the transformation matrix, to obtain the coordinates of the radar point cloud in the pixel coordinate system.

In an embodiment of the present disclosure, the classification module 402 is also used to: identifying a target object from the original image information by using a preset deep neural network; determining pixel points corresponding to the target object and coordinates of each pixel point; determining whether the pixel points corresponding to the target object are obstacle pixel points or non-obstacle pixel points; when the pixel points corresponding to the target object are obstacle pixel points, determining the radar point cloud corresponding to the obstacle pixel points in the fused image information to be the obstacle point cloud, and when the pixel points corresponding to the target object are non-obstacle pixel points, determining the radar point cloud corresponding to the non-obstacle pixel points in the fused image information to be the non-obstacle point cloud.

In an embodiment of the present disclosure, the grouping module 404 is further configured to: dividing the obstacle point cloud into a plurality of sets; obtaining the at least one radar point cloud group by clustering the obstacle point cloud corresponding to each of the plurality of sets.

In an embodiment of the present disclosure, the grouping module 404 is further configured to: use a DBSCAN clustering algorithm to cluster the obstacle point cloud.

In an embodiment of the present disclosure, the grouping module 404 is further configured to: identifying the target object from the fused image information by using the preset deep neural network; determining the bounding box of the target object; based on the bounding box of the target object, classifying the corresponding obstacle point cloud, clustering the classified obstacle point cloud, and obtaining the point cloud group; obtaining a box according to the radar point cloud group and the corresponding bounding box of the target object; and determining the obstacle corresponding to the radar point cloud group based on the box.

Referring to FIG. 5, it is a schematic diagram of the vehicle-mounted device provided by an embodiment of the present disclosure. The obstacle identification method provided by the embodiment of the present disclosure is applied to a vehicle-mounted device 1, which includes, but is not limited to, a storage device 11 connected to each other through a communication bus 10, at least one processor 12, an image sensor 13, and distance sensor 14. The storage device 11 can be used to store the obstacle identification device 40 installed in the vehicle-mounted device 1, the program codes of each program segment in the obstacle identification device 40 can be stored in the storage device 11 of the vehicle-mounted device 1, and executed by at least one processor 12 to realize the function of obstacle identification.

The image sensor 13 may be an on-board device of the vehicle or a camera device such as a camera, connected externally to the vehicle, to capture multiple images or videos in front of the vehicle.

The distance sensor 14 may be a radar device externally connected to the vehicle, and is used to detect obstacles near the vehicle. The obstacle may be any object or pedestrian that hinders the vehicle from running.

The storage device 11 may include random access storage device, and may also include non-volatile storage device, such as hard disk, internal storage device, plug-in hard disk, smart storage device card (SMC), secure digital (SD) card, a flash card, at least one magnetic disk storage device, flash storage device, or other volatile solid-state storage devices.

In one embodiment, the processor 12 may be a central processing unit (CPU), and may also be other general-purpose processors, digital signal processors (DSP), application specific integrated circuits (ASIC), Field-Programmable Gate Array (FPGA) or other programmable logic devices, discrete gate or transistor logic devices, discrete hardware components, etc. The general-purpose processor may be a microprocessor, or the processor may be any other conventional processor and the like.

If the program codes and various data in the storage device 11 are implemented in the form of software function units and sold or used as independent products, they can be stored in a computer-readable storage medium. Based on this understanding, the present disclosure implements all or part of the processes in the methods of the above embodiments, such as the lane line discrimination method, which can also be completed by instructing related hardware through computer programs, and the computer programs can be stored in computer-readable storage. In the medium, when the computer program is executed by a processor, the steps of the above-mentioned various method embodiments can be realized. Wherein, the computer program includes computer program code, and the computer program code may be in the form of source code, object code, executable file or some intermediate form. The computer readable medium may include: any entity or device capable of carrying the computer program code, recording medium, U disk, removable hard disk, magnetic disk, optical disk, computer storage device, read-only storage device (ROM, Read-Only Storage device) wait.

It can be understood that the module division described above is a logical function division, and there may be another division method in actual implementation. In addition, each functional module in each embodiment of the present disclosure may be integrated into the same processing unit, or each module may exist separately physically, or two or more modules may be integrated into the same unit. The above-mentioned integrated modules can be implemented in the form of hardware, or in the form of hardware plus software function modules.

Finally, it should be noted that the above embodiments are only used to illustrate the technical solutions of the present disclosure and not to limit them. Although the present disclosure has been described in detail with reference to the preferred embodiments, those skilled in the art should understand that the technical solutions of the present disclosure can be Modifications or equivalent replacements may be made without departing from the spirit and scope of the technical solutions disclosed herein.

What is claimed is:

1. An obstacle identification method applied to a vehicle-mounted device, the method comprising:

collecting radar information and original image information, and obtaining fused image information by fusing the radar information with the original image information;

acquiring obstacle point cloud and non-obstacle point cloud from the fused image information, comprising: identifying a target object from the original image information by using a preset deep neural network; determining pixel points corresponding to the target object and coordinates of the pixel points; determining whether the pixel points corresponding to the target object are obstacle pixel points or non-obstacle pixel points; in response that the pixel points corresponding to the target object are obstacle pixel points, determining radar point cloud corresponding to the obstacle pixel points in the fused image information to be the obstacle point cloud;

and in response that the pixel points corresponding to the target object are non-obstacle pixel points, determining radar point cloud corresponding to the non-obstacle pixel points in the fused image information to be the non-obstacle point cloud;

filtering out the non-obstacle point cloud from the fused image information;

obtaining at least one radar point cloud group by grouping the obstacle point cloud, comprising: dividing the obstacle point cloud into a plurality of sets; and obtaining the at least one radar point cloud group by clustering the obstacle point cloud corresponding to each set of the plurality of sets; and identifying an obstacle corresponding to each group of the at least one radar point cloud group.

2. The obstacle identification method according to claim 1, wherein the clustering of the obstacle point cloud corresponding to each set of the plurality of sets comprises:

clustering the obstacle point cloud corresponding to each set of the plurality of sets using a density-based spatial clustering of applications with noise (DBSCAN) clustering algorithm.

3. The obstacle identification method according to claim 1, wherein the obtaining of the at least one radar point cloud group by clustering the obstacle point cloud corresponding to each of the plurality of sets comprises:

identifying the target object from the fused image information by using a preset deep neural network;

determining a bounding box of the target object;

classifying obstacle point cloud corresponding to the target object based on the bounding box of the target object;

clustering the classified obstacle point cloud, and obtaining a point cloud group;

obtaining a surrounding box of the target object according to the radar point cloud group and the bounding box of the target object; and determining the obstacle corresponding to the radar point cloud group based on the surrounding box.

4. A vehicle-mounted device comprising:

a storage device;

at least one processor; and the storage device storing one or more programs, which when executed by the at least one processor, cause the at least one processor to:

collect radar information and original image information, and obtain fused image information by fusing the radar information with the original image information;

acquire obstacle point cloud and non-obstacle point cloud from the fused image information, comprising: identifying a target object from the original image information by using a preset deep neural network; determining pixel points corresponding to the target object and coordinates of the pixel points; determining whether the pixel points corresponding to the target object are obstacle pixel points or non-obstacle pixel points; in response that the pixel points corresponding to the target object are obstacle pixel points, determining radar point cloud corresponding to the obstacle pixel points in the fused image information to be the obstacle point cloud; and in response that the pixel points corresponding to the target object are non-obstacle pixel points, determining radar point cloud corresponding to the non-obstacle pixel points in the fused image information to be the non-obstacle point cloud;

filter out the non-obstacle point cloud from the fused image information;

obtain at least one radar point cloud group by grouping the obstacle point cloud, comprising: dividing the obstacle point cloud into a plurality of sets; and obtaining the at least one radar point cloud group by clustering the obstacle point cloud corresponding to each set of the plurality of sets; and identify an obstacle corresponding to each group of the at least one radar point cloud group.

5. The vehicle-mounted device according to claim 4, wherein the clustering of the obstacle point cloud corresponding to each set of the plurality of sets comprises:

clustering the obstacle point cloud corresponding to each set of the plurality of sets using a density-based spatial clustering of applications with noise (DBSCAN) clustering algorithm.

6. The vehicle-mounted device according to claim 4, wherein the obtaining of the at least one radar point cloud group by clustering the obstacle point cloud corresponding to each of the plurality of sets comprises:

identifying the target object from the fused image information by using a preset deep neural network;

determining a bounding box of the target object;

classifying obstacle point cloud corresponding to the target object based on the bounding box of the target object;

clustering the classified obstacle point cloud, and obtaining a point cloud group;

obtaining a surrounding box of the target object according to the radar point cloud group and the bounding box of the target object; and determining the obstacle corresponding to the radar point cloud group based on the surrounding box.

7. A non-transitory storage medium having instructions stored thereon, when the instructions are executed by a processor of a vehicle-mounted device, the processor is caused to perform an obstacle identification method, wherein the method comprises:

collecting radar information and original image information, and obtaining fused image information by fusing the radar information with the original image information;

acquiring obstacle point cloud and non-obstacle point cloud from the fused image information, comprising: identifying a target object from the original image information by using a preset deep neural network; determining pixel points corresponding to the target object and coordinates of the pixel points; determining whether the pixel points corresponding to the target object are obstacle pixel points or non-obstacle pixel points; in response that the pixel points corresponding to the target object are obstacle pixel points, determining radar point cloud corresponding to the obstacle pixel points in the fused image information to be the obstacle point cloud; and in response that the pixel points corresponding to the target object are non-obstacle pixel points, determining radar point cloud corresponding to the non-obstacle pixel points in the fused image information to be the non-obstacle point cloud;

filtering out the non-obstacle point cloud from the fused image information;

obtaining at least one radar point cloud group by grouping the obstacle point cloud, comprising: dividing the obstacle point cloud into a plurality of sets; and obtaining the at least one radar point cloud group by clustering the obstacle point cloud corresponding to each set of the plurality of sets; and identifying an obstacle corresponding to each group of the at least one radar point cloud group.

8. The non-transitory storage medium according to claim 7, wherein the clustering of the obstacle point cloud corresponding to each set of the plurality of sets comprises:

clustering the obstacle point cloud corresponding to each set of the plurality of sets using a density-based spatial clustering of applications with noise (DBSCAN) clustering algorithm.

* * * * *